US008683228B2

(12) United States Patent
Stokes

(10) Patent No.: US 8,683,228 B2
(45) Date of Patent: Mar. 25, 2014

(54) SYSTEM AND METHOD FOR WORM DATA STORAGE

(76) Inventor: Terry Lee Stokes, Redmond, WA (US)

( * ) Notice: Subject to any disclaimer, the term of this patent is extended or adjusted under 35 U.S.C. 154(b) by 1360 days.

(21) Appl. No.: 12/014,721

(22) Filed: Jan. 15, 2008

(65) Prior Publication Data

US 2008/0172563 A1 Jul. 17, 2008

Related U.S. Application Data

(60) Provisional application No. 60/885,129, filed on Jan. 16, 2007.

(51) Int. Cl.
*G06F 12/14* (2006.01)
*H04L 29/06* (2006.01)
*H04L 9/32* (2006.01)
*G06F 17/30* (2006.01)
*H04N 7/167* (2011.01)
*G06F 7/00* (2006.01)

(52) U.S. Cl.
USPC ........... 713/193; 713/165; 713/168; 713/187; 726/26; 380/201; 707/662; 707/663; 707/664; 707/694

(58) Field of Classification Search
USPC .................... 713/193, 165, 168, 187; 726/26; 380/201; 707/662–664, 694
See application file for complete search history.

(56) References Cited

U.S. PATENT DOCUMENTS

| | | | |
|---|---|---|---|
| 5,758,360 A | 5/1998 | Zbikowski | |
| 5,931,947 A | 8/1999 | Burns | |
| 6,021,408 A | 2/2000 | Ledain | |
| 6,021,414 A | 2/2000 | Fuller | |
| 6,336,175 B1 | 1/2002 | Shaath | |
| 6,405,315 B1 | 6/2002 | Burns | |
| 6,470,449 B1 * | 10/2002 | Blandford | 713/178 |
| 6,615,330 B2 | 9/2003 | Debiez | |
| 6,643,750 B2 | 11/2003 | Achiwa | |
| 6,775,679 B2 | 8/2004 | Gupta | |
| 6,807,632 B1 | 10/2004 | Carpentier | |
| 6,820,069 B1 * | 11/2004 | Kogan et al. | 706/46 |
| 6,912,645 B2 | 6/2005 | Dorward | |
| 6,976,165 B1 | 12/2005 | Carpentier | |
| 2005/0278383 A1 | 12/2005 | Kazar | |
| 2006/0206487 A1 * | 9/2006 | Harada et al. | 707/9 |
| 2007/0261071 A1 * | 11/2007 | Lunt et al. | 725/13 |

\* cited by examiner

*Primary Examiner* — Aravind Moorthy

(57) ABSTRACT

A system and method for Write Once, Read Many (WORM) compliant storage is disclosed. A storage administrator in user space is employed as an interface between the kernel space WORM VFS and the user applications. The storage administrator accesses the WORM VFS through the operating system's Virtual File System. The WORM VFS comprises of three layers: a data encryption\compression layer, the WORM filesystem layer and a logical volume manager. The data encryption\compression layer preprocesses the data as it moves between from the user space and the WORM filesystem layer. The WORM filesystem layer stores the compressed and encrypted data on the physical disk drives in a specialized disk format. The logical volume manager manages the physical disk drives. A NVRAM journal aids in crash recovery.

19 Claims, 25 Drawing Sheets

Supported Operations

Filesystem Mount/Unmount
Filesystem Statistics
Volume Statistics
File Creation
File Reading
File Deletion (if past retention period)
File Annotation (auditing functions)

Unsupported Operations

File Deletion (prior to retention period)
File Content Modification or Appending
File Attribute Modification
Directory Support (creation, listing, deletion, etc.)
Symbolic Links

Supported Operations

| |
|---|
| Filesystem Mount/Unmount |
| Filesystem Statistics |
| Volume Statistics |
| File Creation |
| File Reading |
| File Deletion (if past retention period) |
| File Annotation (auditing functions) |

FIG. 1A

Unsupported Operations

File Deletion (prior to retention period)

File Content Modification or Appending

File Attribute Modification

Directory Support (creation, listing, deletion, etc.)

Symbolic Links

FIG. 1B

Network Storage Information Table

| Start Date | ID Start | ID Stop | Location | Storage Partition | State | Free MB | Access ms |
|---|---|---|---|---|---|---|---|
| 2/3/06 | 0000 | 1234 | London1 | \groupL1a | ready | 52369 | 132 |
| 10/23/05 | 1235 | 2254 | NYC1 | \groupN1a | ready | 43221 | 23 |
| 10/23/05 | 2255 | 3378 | NYC2 | \groupN2a | ready | 96676 | 34 |
| 10/23/05 | 3378 | 4865 | NYC2 | \groupN2b | ready | 45312 | 35 |
| 9/18/06 | 4866 | 7697 | Boston1 | \groupB1a | ready | 12314 | 80 |
| 6/16/06 | 7698 | 8745 | NYC2 | \groupN2c | ready | 23890 | 34 |
| 9/18/06 | 8746 | 9999 | Boston1 | \groupB1b | ready | 67114 | 85 |
| 3/27/04 | 2687 | 3956 | NYC1 | \groupN1a | read only | 43221 | 23 |
| 7/14/03 | 5586 | 6132 | NYC1 | \groupN1b | read only | 324 | 23 |

FIG. 3C

Deletion Holds Table — 361

| Rule | Condition |
|---|---|
| 1. | Type = Any and Groups = Execs |
| 2. | Type = Email and Users = John Smith, George Martin, Pete Nobody |
| 3. | Type = Spreadsheets, Email, Reports and Groups = Execs, Finance |
| 4. | Type = VoIP and Groups = Customer Service |
| 5. | Type = Any and Users = All |

FIG. 3G

SYSTEM AND METHOD FOR WORM DATA STORAGE

REFERENCES CITED

T. Stokes, "Compliance Appliance Product Specification," 30 pages, January 2004.
T. Stokes, "Compliance Appliance Storage Design," 47 pages, October 2004.
T. Stokes, "Extraordinary FS Filesystem," 2 pages, March 2005.
T. Stokes, "Indexing/Search Design Discussion," 18 pages, June 2005.

FIELD OF THE INVENTION

The present invention relates generally to Write Once, Read Many (WORM) data storage. More specifically, the present invention relates to techniques for the secure storage and retrieval of electronic data, such that the electronic data cannot be modified or deleted during its predetermined lifetime, after which the electronic data is automatically deleted.

BACKGROUND OF THE INVENTION

The use of electronic communications, such as email, instant messaging, web pages, SMS and voice over IP, and computer files, such as presentations, spreadsheets and documents, for business purposes have become prevalent in today's business world. Over the years, as electronic communications and computer files have supplanted the use of paper documents, it has become more and more important to find a way to archive copies of electronic data files.

There are many reasons why business communications and documents in general need to be archived in searchable WORM storage. Many government regulations, such as Sarbanes Oxley, HIPAA, Patriot Act, GLB and SEC, require that business communications be archived for a number of years. Evidentiary discovery rules require the production of business communications pertinent to the issues in a case. And corporate governance and disaster recovery requires the archival of important business communications and documents in case the originals are destroyed.

In the past, the archival of business communications was limited to storing corporate reports and accounting books to an off-site warehouse. As email came into wide usage, the archival of emails became a regulatory requirement, but this was mostly limited to financial institutions. In the last five years, due to the increased prevalence of electronic communications and the increase in government regulations resulting from several accounting scandals, nearly all companies are required to archival some amount of email, instant messages, business reports and accounting spreadsheets.

Currently, most companies meet government regulatory and corporate governance requirements by archiving copies of corporate document files and email backups to optical WORM storage, such as optical tape or CD-R discs, and storing the optical WORM storage at a third party vendor's location. There are several drawbacks to this approach. The optical WORM storage archives are not readily available. It is difficult to find specific archived documents among a set of optical WORM storage, since there is no consolidated index, requiring each optical disc or tape to be retrieved, loaded and searched. To find a specific email can require a large effort, since backups normally occur on a daily or weekly basis and each backup needs to be restored to an email server before it can be searched.

Another drawback to the "copy everything to optical WORM storage" is the inability to delete documents and emails after their retention period has lapsed. Information stored in these archives could potentially be used against a company in the event of a lawsuit, so it is important to delete the archived material as soon as government regulatory and corporate governance retention requirements are met. While an optical WORM storage media can be physically destroyed at the end of the retention period, a manual process must be in place to implement this. Plus, since an individual file cannot be deleted on the optical WORM storage media, the entire disc or tape must be retained until the retention period of every electronic data file has passed, forcing files to be saved that could have been deleted.

Finally, the electronic data files on the optical WORM storage media are typically not encrypted. This allows anyone with access to the optical WORM storage media and an optical WORM storage reader to potentially view confidential corporate information.

Several products have been created to address these issues. They seek to implement WORM storage on regular hard disk drives. The two main storage products are EMC's Centera, which uses Content Addressable Storage (CAS) and Network Appliance's Netstore, which uses SnapLock. Both prevent file deletion by using a custom operating system. Both also employ a custom proprietary filesystem, which means their hard drives are unreadable in general purpose operating systems.

The drawback to these storage products is they were created for general purpose network storage, abet with WORM characteristics. Since third-party user applications access via NFS or SAN, the products need to provide a full set of filesystem operations. The underlying hard disk data is not completely encrypted. And there is no automatic deletion mechanism when electronic data files reach the end of their retention period.

SUMMARY OF THE INVENTION

The present invention implements systems and methods to provide Write Once, Read Many (WORM) compliant storage. The system comprises a set of interconnecting components: user space applications, the storage administrator, the virtual file system, optional off-box network storage, the WORM VFS and on-box storage. The WORM VFS comprises three layers: the data encryption\compression layer, the WORM filesystem layer and the logical volume manager. The storage administrator, its index database and the applications that access it, such as messaging applications and file archival applications, reside in user space. All other components of the invention reside in kernel space. User space applications store and access electronic data files using the storage administrator. Since there is no disk directory structure, the storage administrator maintains an index database with a cross-reference between file identification and file location. The file identification is a value known to the user space applications, such as document name or email headers. The file location contains information used to locate the on-box inode or off-box file. For on-box files, the location includes the filesystem ID, the allocation group ID and the inode ID. In the preferred embodiment, the storage administrator accesses files using the virtual file system interface (VFS) implemented in most UNIX operating systems. The operating system's VFS layer forwards the file or filesystem operation to the data encryption\compression layer of the WORM VFS by calling the layer's registered callback function for the operation. If the file or filesystem operation is not supported, the call returns with an error. Otherwise, operation is verified as coming from the storage administrator using the key the WORM VFS received when the filesystem was mounted (FIG. 8A), which is included in the operation's data. The data encryption\compression layer handles any data processing needed and determines where the file is located. If off-box, the data encryption\compression layer accesses the appropriate off-box WORM storage mounted locally using an NFS or SAN connection. If on-box, the data encryption\compression layer forwards the processed data and operation data to the WORM filesystem layer. The WORM filesystem layer records the operation in the non-volatile RAM backed journal. The WORM filesystem layer then performs the requested operation and returns the operation's result back up the chain to the storage administrator and finally to the user space application. The WORM filesystem layer lies on top of the logical volume manager. The logical volume manager is used to group a set of physical disks into a logical volume. The set of physical disks that a logical volume comprises is transparent to the WORM filesystem layer, it only knows about the logical volume. The logical volume manager maintains each logical volume and notifies the storage administrator about any important events, such as disk failures or disk full, so that human operators can be alerted. In the preferred embodiment, the logical volume manager is implemented using Vinum, a UNIX operating system component and employs mirrored drives, but alternative embodiments could implement the logical volume manager as a VFS layer or embedded within the kernel and use non-mirrored drives or storage arrays.

BRIEF DESCRIPTION OF DRAWINGS

FIG. 1A shows a list of supported file and filesystem operations.

FIG. 1B shows a list of unsupported file and filesystem operations.

FIG. 3C shows an example of a network storage information table of the preferred embodiment of the present invention.

FIG. 3G shows an example of a Deletion Holds Table of the preferred embodiment of the present invention.

DETAILED DESCRIPTION OF THE INVENTION

The present invention will be illustrated below in conjunction with an exemplary storage network. It should be understood, however, that the invention is not limited to use with any particular type of network storage, network interface card, file server or any other type of network or computer hardware. It should also be understood that while the term "electronic data" is used in the description, the invention is not limited to either electronic communications or computer files. In alternative embodiments, the invention could archive web pages, telephone recordings or binary data objects. Moreover while the preferred embodiment takes the form of a WORM storage appliance, the invention can also be delivered as one or more software products as alternative embodiments.

The present invention has several characteristics that inherently make its storage WORM compliant. One characteristic relates to its file and filesystem operations support. FIG. 1A shows the file and filesystem operations supported by the invention. FIG. 1B shows the file and filesystem operations specifically not supported by the invention. Note that no directory operations or file modification (after creation) operations are supported in the invention. All of the supported operations are available only through the storage administrator 204, which requires authorization for all file and filesystem operations.

Figure 2:
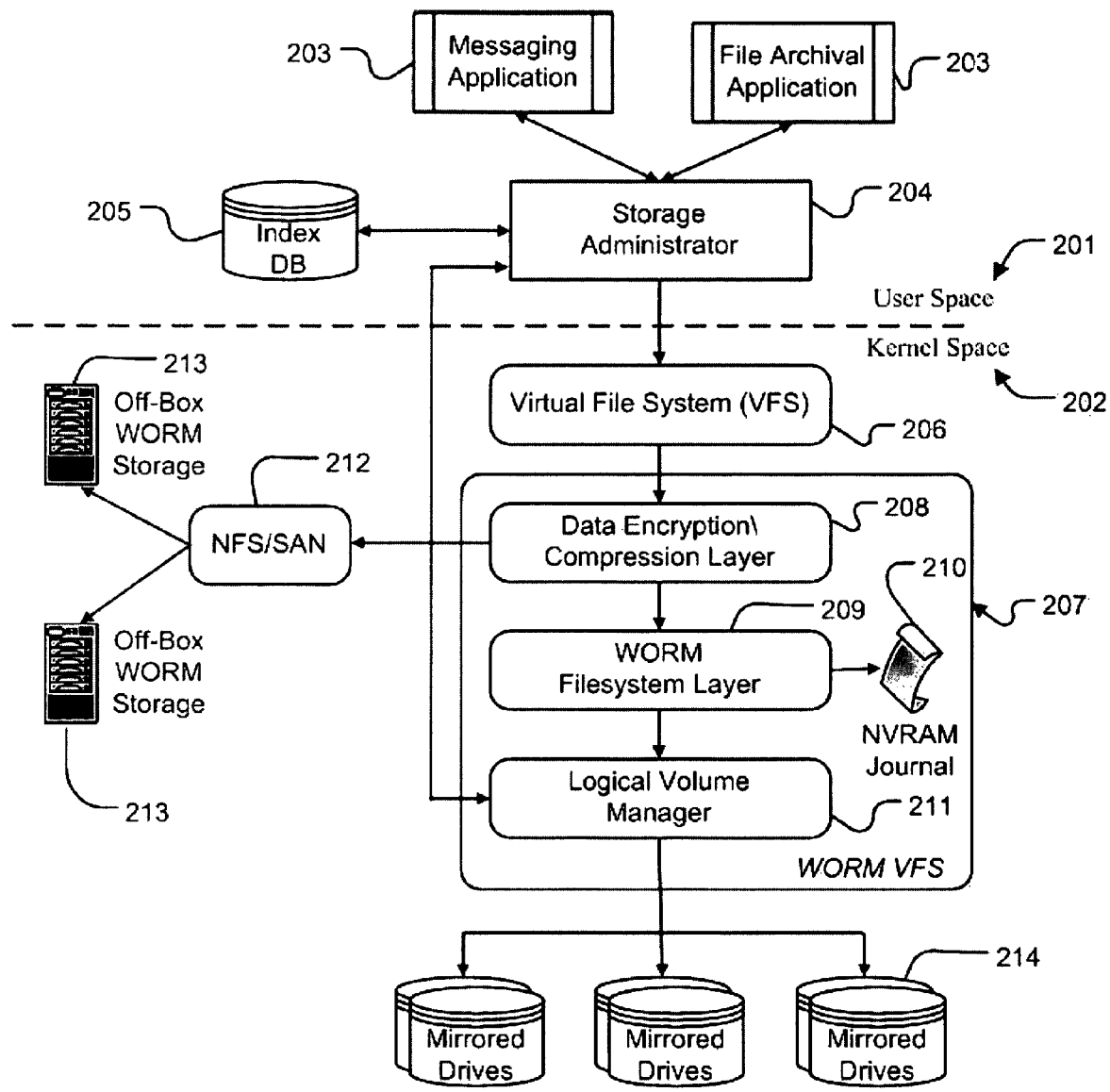
FIG. 2 shows the components of the preferred embodiment of the present invention.

FIG. 2 shows the internal components of the preferred embodiment of the present invention. The storage administrator 204, its index database 205 and the applications that access it, such as messaging applications and file archival applications 203, reside in user space 201. In alternative embodiments, the storage administrator 204 and index database 205 can reside in kernel space 202, accessible through system calls. All other components of the invention reside in kernel space 202. The preferred embodiment of the present invention implements the kernel space 202 components using kernel loadable modules, but alternative embodiments could embed the functionality within the kernel code, modify existing filesystem code or implement user space applications 203.

User space applications 203 store and access electronic data files using the storage administrator 204. Since there is no disk directory structure, the storage administrator 204 maintains an index database 205 with a cross-reference between file identification and file location. The file identification is a value known to the user space 201 applications, such as document name or email headers. The file location contains information used to locate the on-box inode or off-box file. For on-box files, the location includes the filesystem ID, the allocation group ID and the inode ID.

In the preferred embodiment, the storage administrator 204 accesses files using the virtual file system interface (VFS) 206 implemented in most UNIX operating systems. The operating system's VFS 206 layer forwards the file or filesystem operation to the data encryption\compression layer 208 of the WORM VFS 207 by calling the layer's registered callback function for the operation. If the file or filesystem operation is not supported, the call returns with an error. Otherwise, operation is verified as coming from the storage administrator 204 using the key the WORM VFS 207 received when the filesystem was mounted (FIG. 8A), which is included in the operation's data.

The data encryption\compression layer 208 handles any data processing needed and determines where the file is located. If off-box, the data encryption\compression layer 208 accesses the appropriate off-box WORM storage 213 mounted locally using an NFS or SAN 212 connection. If on-box, the data encryption\compression layer 208 forwards the processed data and operation data to the WORM filesystem layer 209. The WORM filesystem layer 209 records the operation in the non-volatile RAM backed journal 210. The WORM filesystem layer 209 then performs the requested operation and returns the operation's result back up the chain to the storage administrator 204 and finally to the user space application 203.

The WORM filesystem layer 209 lies on top of the logical volume manager 211. The logical volume manager 211 is used to group a set of physical disks 214 into a logical volume. The set of physical disks 214 that a logical volume comprises is transparent to the WORM filesystem layer 209, it only knows about the logical volume. The logical volume manager 211 maintains each logical volume and notifies the storage administrator 204 about any important events, such as disk failures or disk full, so that human operators can be alerted. In the preferred embodiment, the logical volume manager 211 is implemented using Vinum, a UNIX operating system component and employs mirrored drives, but alternative embodiments could implement the logical volume manager 211 as a VFS layer or embedded within the kernel and use non-mirrored drives or storage arrays.

The diagrams and illustrative examples in FIG. 3A, FIG. 3B, FIG. 3C, FIG. 3D, FIG. 3E, FIG. 3F and FIG. 3G describe the operation of the preferred embodiment of the storage administrator 204 component of the present invention. It should be understood, however, that the invention is not limited to use within storage networks. For example, alternative embodiments could employ the WORM storage appliance outside a storage network, using only internal disk storage or use disk arrays.

Figure 3A:
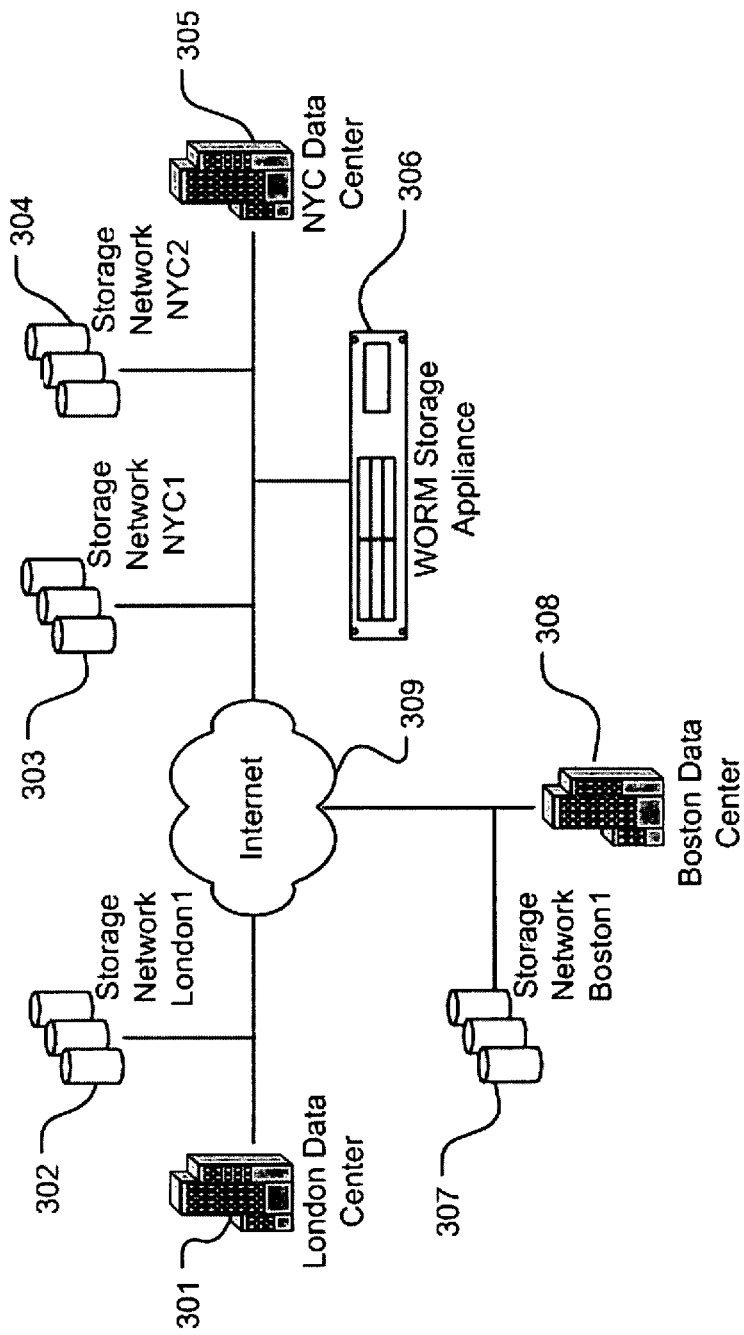
FIG. 3A shows an example of a storage network containing the invention.

FIG. 3A shows an example of a storage network containing the invention (WORM storage appliance) and multiple storage locations. The diagram shows three data centers, in London 301, Boston 308 and New York 305. The WORM storage appliance 306 is located on the New York network. The London data center 301 has one storage network 302. The Boston data center 308 has one storage network 307. The New York data center 305 has two storage networks, 303 and 304. Each storage network can contain a mixture of NFS storage, SAN storage and WORM storage appliances. All of the storage networks are accessible to the WORM storage appliance 306 via the Internet 309. The WORM storage appliance 306 also has internal WORM storage available, as described in FIG. 2.

Figure 3B:
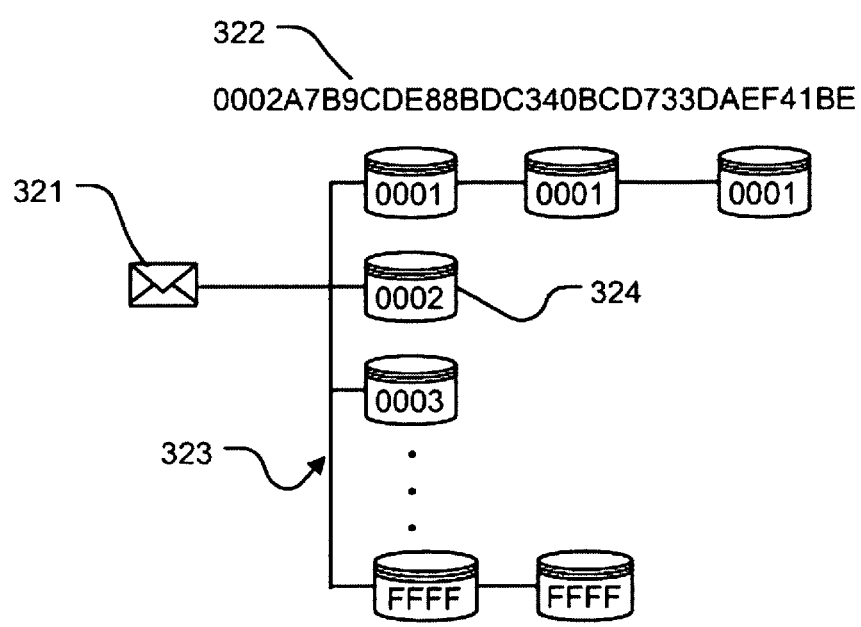
FIG. 3B shows an example of data hashing for storage location.

FIG. 3B shows an example of data hashing for storage location. This method is used to determine where to store the electronic data file so that only one copy is saved, which reduces the amount of storage used by a company. A hash 322 of the complete electronic data file 321 is created using a standard algorithm such as MD5 or SHA. The hash 322 of the electronic data file 321 is used to determine the storage location, much like hashes are used to sort items into buckets 323. In this example, the electronic data file 321 would be placed into the "0002" bucket 324 using the first four values of the hash 322.

FIG. 3C shows an example of a network storage information table 330 of the preferred embodiment of the present invention. This table is used to determine where an electronic data file is to be stored, where to later look for the electronic data file and whether the IT administrator should be notified of storage problems. The table is made up of rows, which represent a storage unit, and columns, which represent the attributes of a storage unit.

The network storage information table 330 includes eight columns of information. The first column, start date 331, specifies the date of the first electronic data file in the storage unit. The ID start 332 and ID stop 333 columns specify the range of hashes that can be stored in the storage unit, using a portion of the computed hash. This range must be unique and not overlap with the hash range of any other storage unit for writable storage units. All hash ranges must be present in the network storage information table 330, so that for any computed hash of an electronic data file, it can be written to one and only storage unit, to prevent duplicate copies of electronic data files.

The location 334 and storage partition 335 columns are used to identify the physical location of a storage unit. As seen in FIG. 3A, the location 334 corresponds to a storage network, for example the first row shows a location of London1 302. The storage partition 335 corresponds to a portion of that storage network. Using location 334 and storage partition 335, the available storage networks can be broken up into a grid of storage units.

The state column 336 holds the current state of the storage unit. Typical states include offline, ready, read only and full. The free MB column 337 shows the amount of free space available. Column 338 shows the current access time in ms, used in staging electronic data file retrievals.

Rows 339 show examples of read only storage units. These storage units are no longer used for new electronic data files. This is needed to allow changes to the storage grid. While using a storage network such as SAN allows the addition of additional storage without modifying the actual network configuration, there are times when a modification of the storage grid is desired, such as when adding remote storage networks or modifying the balance of the storage. After modifying the network storage information table 330 to reflect the new storage grid, new electronic data files will go to the desired storage unit, but old electronic data files will hash to the wrong storage unit. One solution is to move all the old electronic data files to the storage unit it hashes in a secure manner. The preferred embodiment of the invention simply leaves the old electronic data files on the original storage unit, but list the storage unit in the network storage information table 330 as read only. File retrieval will then search each storage unit, whose ID range matches the electronic data file that describes its location, using the start date column 331 as a hint.

It should be understood that each instance of the present invention within the storage network will contain a duplicate copy of the network storage information table 330 within its storage administrator 204. Included within the network storage information table 330 will be the on-box WORM VFS volumes, each of which will have a unique location 334 and storage partition 335 pair.

Whenever an electronic data file is received by the storage administrator 204, it first hashes the file's contents to determine which network storage unit to archive the file to. If the selected location is controlled by the storage administrator 204, it then converts the electronic data file into a structured file; otherwise it transmits the electronic data file to the WORM storage appliance that controls the selected location. The purpose of converting the electronic data file into a structured format is to allow searches and holds to be based on well defined parts of the electronic data instead of solely on information about the file. For example, deletion holds can be performed based on the recipient of emails or the authors of Word documents.

Figure 3D:
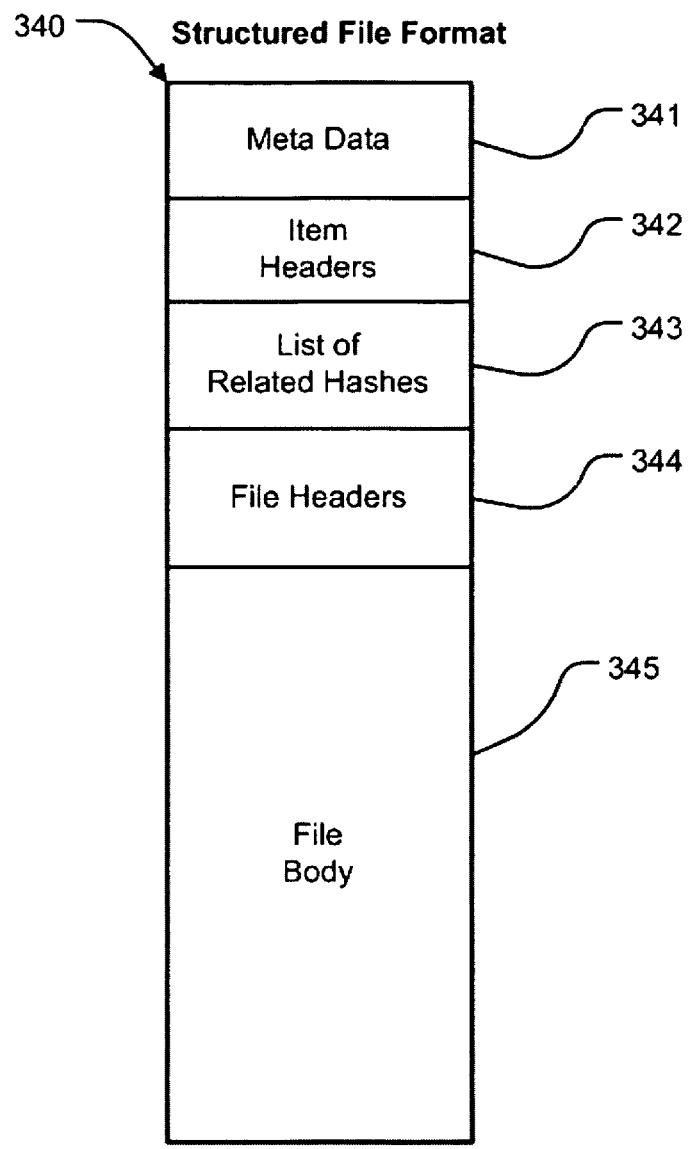
FIG. 3D shows the structured message format of the preferred embodiment of the present invention.
Figure 3E:
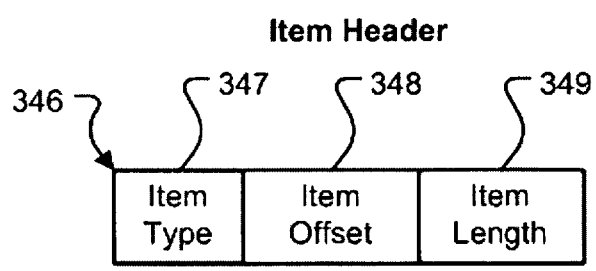
FIG. 3E shows the format of a single item header contained in the Item Headers portion of the structured message format of the preferred embodiment.
Figure 3F:
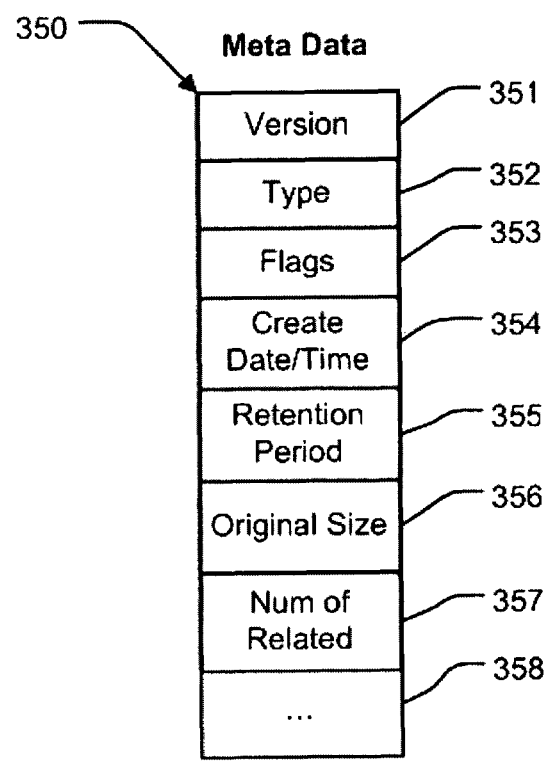
FIG. 3F shows an example of the Meta Data portion of the structured message format of the preferred embodiment.

FIG. 3D generally illustrates the structured message format 340 produced by the storage administrator 204. At the beginning of the structure is Meta Data 341 that describes the electronic data file. FIG. 3F shows a granular view of the contents of the Meta Data 350 section. Among other things, it contains the structure format version 351, the file type 352, a set of flags 353 to signal special characteristics of the file, such as violations, the time the file was created 354, the retention period 355, the original size of the file 356 before compression and the number of related files (attachments, jpegs, etc.) 357. The Meta Data 350 section may contain additional information 358.

In FIG. 3D, after the Meta Data 341 section is the item headers 342 section. The item headers 342 describe where to find file parts (headers and body) in the structured file 340. FIG. 3E shows the format of each Item Header entry 346. Each consists of an Item Type 347, followed by the Item Offset 348 and an Item Length 349. There is a unique item type 347 for each type of header and body element. The Item Offset 348 is the distance from the beginning of the structured message the item type is located. A special item type is used to signal the end of the item headers.

After the item headers 342 section is the List of Related Hashes 343 unless the file has no related files, as indicted by the number of related files 357 in the Meta Data 350 section of FIG. 3F. After the List of Related Hashes 343 is the File Headers 344 section and at the end of the structured file 340 is the File Body 345.

After the unstructured electronic data file is converted into a structured electronic data file, it is transferred to the WORM VFS, which in turn either writes the file to off-box network attached storage or the on-box WORM storage.

At regular intervals, a process is run within the storage administrator 204 to delete electronic data files that have passed their retention period. Each electronic data file has an absolute retention period embedded in its file when created. The electronic data file cannot be deleted during this retention period, but an electronic data file cannot be prevented from deleting off even past its retention period. This might be necessary if a regulatory investigation or legal action requires a hold on file deletions.

FIG. 3G shows an example of a deletion holds table 360 of the preferred embodiment of the present invention. The deletion holds table 360 is stored within the storage administrator 204 and is modified by IT administrators to place or remove deletion holds. Examples of holds are illustrated by rows 362, 363, 364, 365 and 366. As the storage administrator 204 searches its index database 205 for files available for deletion, it will try to match each file with the conditions 361 for each row in the deletion holds table 360. This may require reading in the electronic data file's metadata to determine if the rule matches. FIG. 8D describes the deletion process in more detail.

Figure 4:
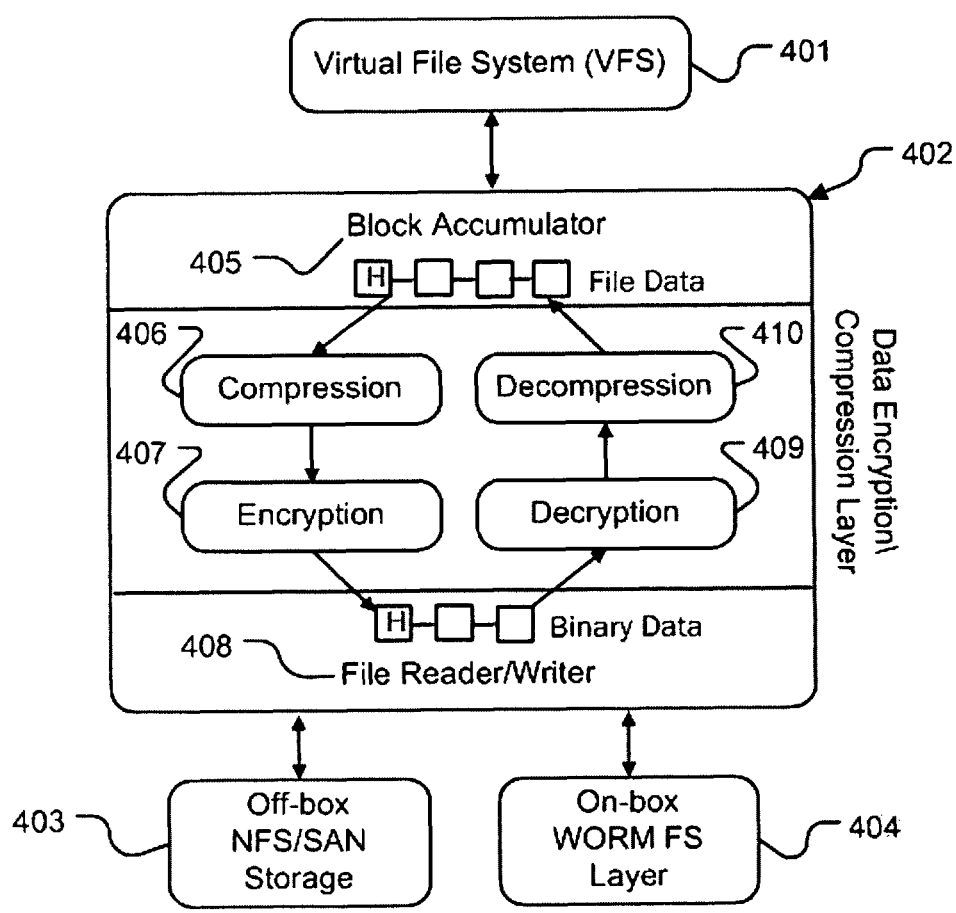
FIG. 4 shows the components of the Data Encryption\Compression Layer of the preferred embodiment of the present invention.

FIG. 4 shows the components of the data encryption\compression layer 402 of the preferred embodiment of the present invention. The operating system's virtual file system (VFS) 401 layer forwards all storage administrator 204 file and filesystem operations to the data encryption\compression layer 402. All operations except file reads and writes are passed on to the appropriate storage location, either off-box NFS/SAN 403 or on-box WORM FS 404, after authenticating the caller was the storage administrator 204. The data encryption\compression layer 402 processes file reads and writes before passing the data onwards.

Since most electronic data files are expected to be fairly small, it is possible to accumulate all the blocks of the files (delayed allocation) before they are passed on to the lower layer. Even for large files, the data can be broken to extents appropriate for the file type. This allows for more efficient writes and reads, since a large part or the entire file can be contiguous. Since archived data is normally retrieved in its entirety or just its Metadata (if performing a search), the filesystem is optimized to retrieve either the electronic data file's inode or its entire contents.

The block accumulator 405 is responsible for accumulating blocks of write data until the file is closed or an extent is filled. The blocks are then run through compression 406 and encryption 407 before being written to either off-box NFS/SAN 403 or on-box WORM FS 404 by the file reader\writer 408. In a like manner, blocks of data is read from either off-box NFS/SAN 403 or on-box WORM FS 404 by the file reader\writer 408, passed through decryption 409 and decompression 410 and then accumulated by the block accumulator 405 before being passed to the storage administrator 204 via the VFS 401 layer. Block diagrams illustrating methods of the present invention for file reading and writing are included as FIG. 8B and FIG. 8C.

Figure 5A:
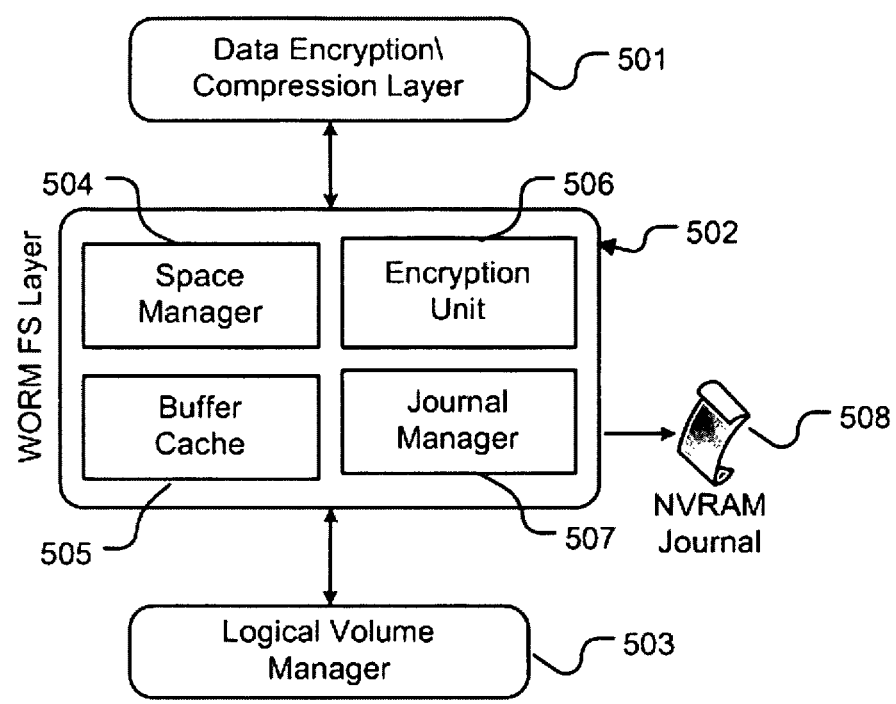
FIG. 5A shows the components of the WORM FS Layer of the preferred embodiment of the present invention.

FIG. 5A shows the components of the WORM FS layer 502 of the preferred embodiment of the present invention. The WORM FS layer 502 lies below and receives operations from the data encryption\compression layer 501 and uses physical storage provided by the lower logical volume manager 503. The WORM FS layer 502 has four components: the Space Manager 504, the Encryption Unit 506, the Journal Manager 507 and the Buffer Cache 505.

The Space Manager 504 manages free extents and inodes. Free inodes and extents are stored in B+ trees. There are two extent B+ trees, one sorted by extent size and the other sorted by block number. Each extent entry contains the allocation group number, the block offset within that group and the number of blocks in the extent. The Space Manager's information is stored in the allocation group headers and the free disk inodes between boots.

The Encryption Unit 506 handles encryption and decryption of inodes (data is encrypted in the data encryption\compression layer 501).

The Journal Manager 507 handles the recovery journal. In order to recover from power failures or other system crashes, each Inode modification is written to a journal before the transaction is committed. On power up, the journal is checked to see if a proper shutdown occurred. If not, each recorded transaction (file create, file delete, audit update, etc.) is checked to see if it completed successfully. Files created, but not fully written will be removed.

Figure 5B:
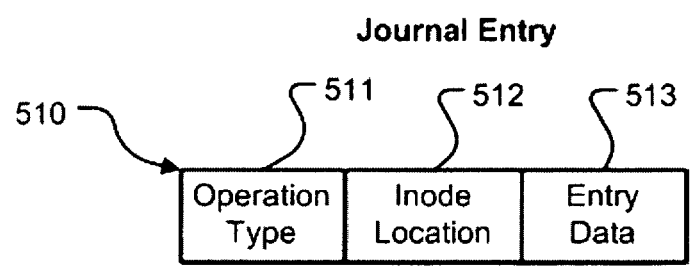
FIG. 5B shows the format of a single journal entry contained in the Journaling Ring Buffer of the preferred embodiment.
Figure 5C:
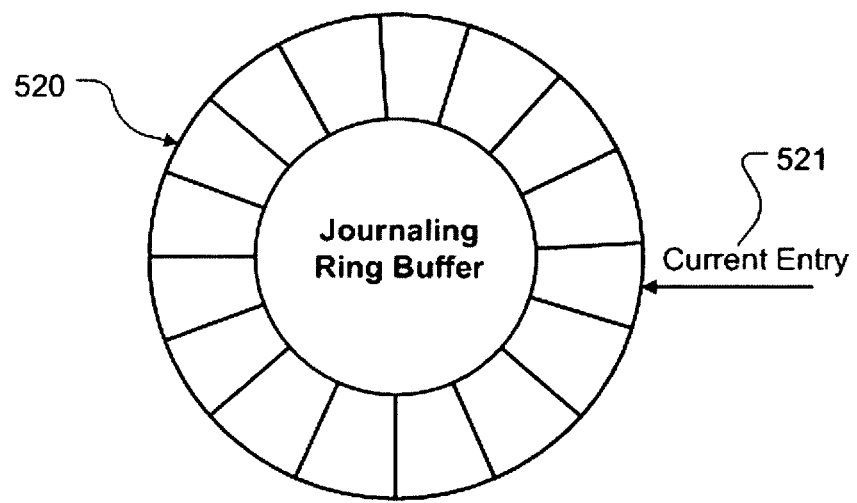
FIG. 5C illustrates the Journaling Ring Buffer of the preferred embodiment.

The journal entries are stored in a ring buffer on non-volatile memory, preferably battery backed RAM. FIG. 5C shows an example of a journaling ring buffer 520 of the preferred embodiment of the present invention. FIG. 5B shows the format of each journal entry 510. Each entry will store the operation type 511, inode location 512, and the entry data 513 needed to roll back the transaction. The block diagram in FIG. 5D describes how the journaling ring buffer 520 is processed during recovery.

The Buffer Cache 505 stores recently used inodes and data blocks to improve performance. It does this by employing a set of B+ trees to store most recently used inodes and disk blocks in block number order.

Figure 5D:
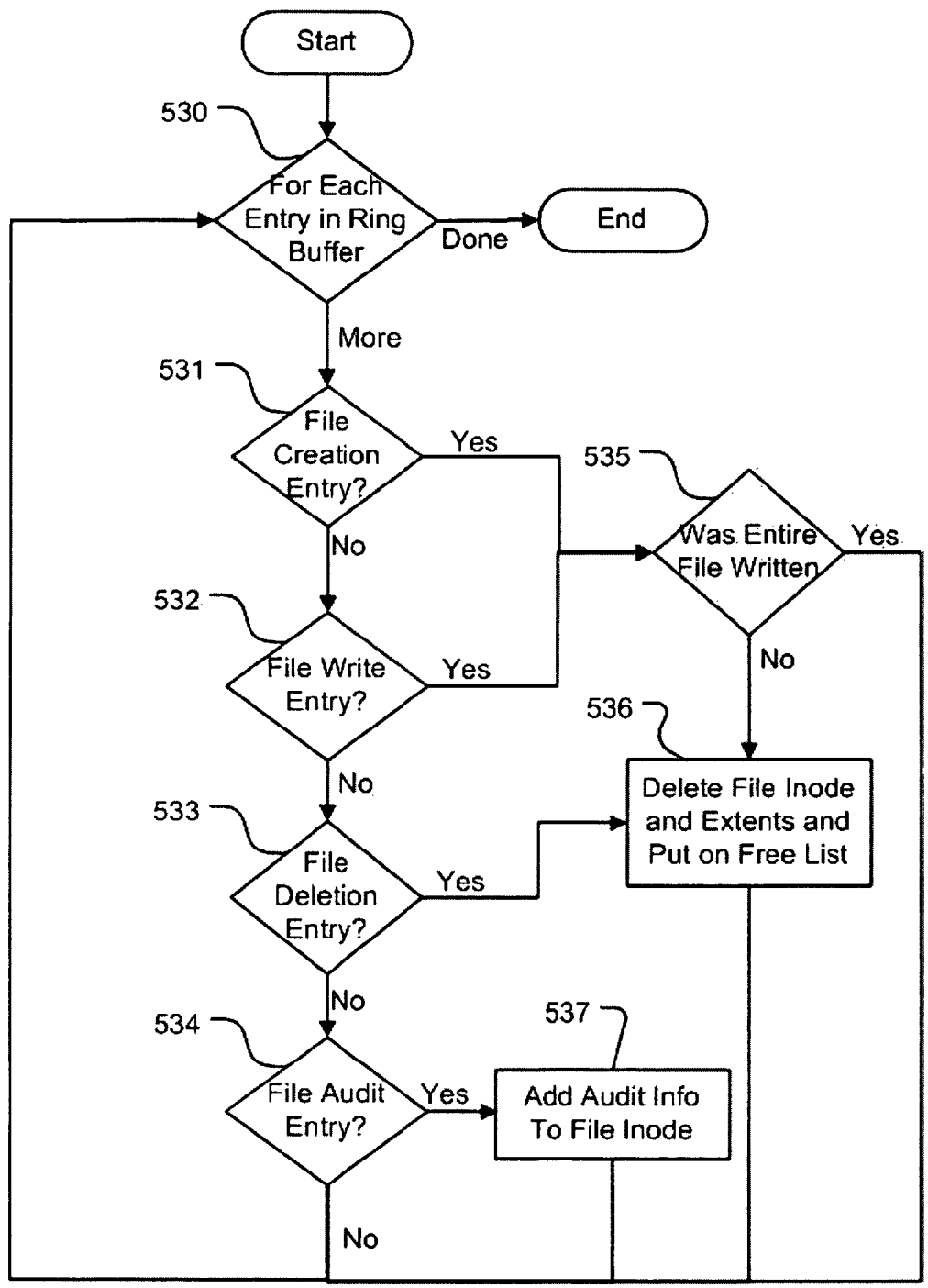
FIG. 5D is a block diagram illustrating a method of the present invention for recovery using the Journaling Ring Buffer entries.

FIG. 5D is a is a block diagram illustrating a method of the present invention for recovery using the journaling ring buffer 520. On startup, each entry in the journaling ring buffer 520, starting at the current entry 521, is processed 530. If it's a file write entry 532, the inode is checked 535 to see if the entire file was written. If not, the file inode and its related data extents are released back to the space manager's free list 536. Otherwise the next entry is checked. If it's a file creation entry 531, the inode is checked 535 to see if the entire file was written. If not, the file inode and its related data extents are released back to the space manager's free list 536. Otherwise the next entry is checked. If it's a file delete entry 533, the file inode and its related data extents are released back to the space manager's free list 536. If it's a file audit entry 534, the audit information is added to the file inode 537.

Figure 6A:
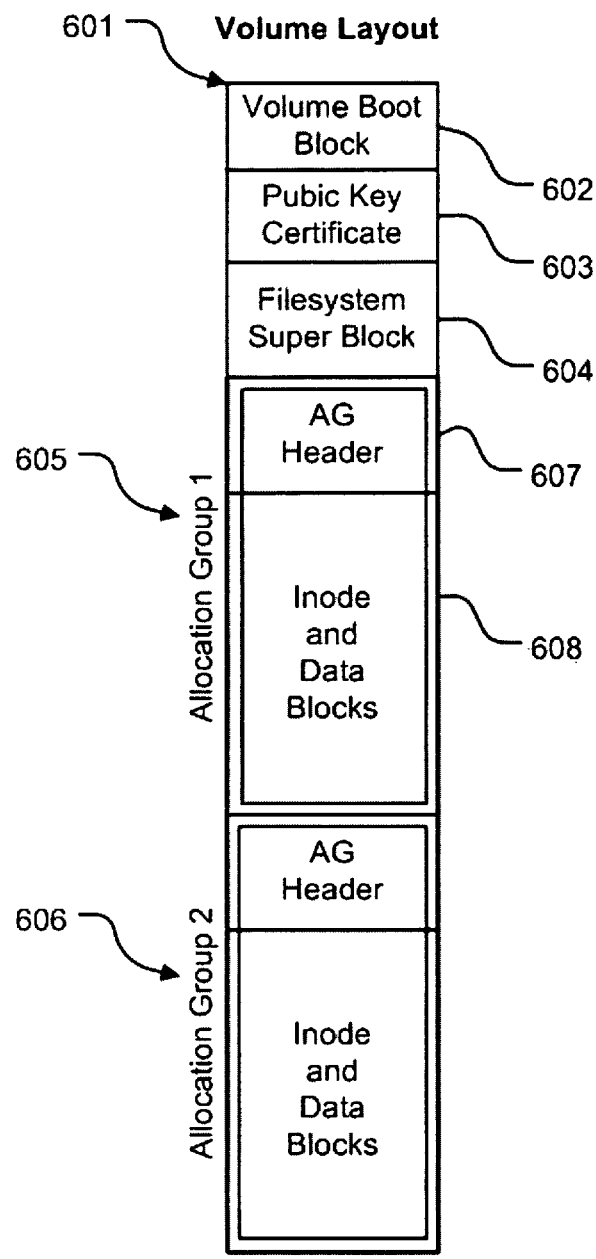
FIG. 6A shows the disk layout of the WORM filesystem of the preferred embodiment of the present invention.

The diagrams and illustrative examples in FIG. 6A, FIG. 6B, FIG. 6C, FIG. 6D and FIG. 6E describe the layout of the filesystem of the preferred embodiment of the present invention. FIG. 6A generally illustrates the volume layout 601 of WORM VFS filesystem (note that this is a logical volume, as presented by the underlying logical volume manager 211). At the beginning of each volume is the volume boot block 602. The volume boot block 602 contains a WORM VFS filesystem identity marker, a unique volume ID and a volume full status. After the volume boot block 602 is a copy of the public key certificate 603 used to encrypt the volume's superblock and allocation group lockboxes. Next is the volume superblock. The rest of the volume is divided into equal sized allocation groups (AG) 605, 606. Allocation groups 605, 606 are used because each group can be accessed independently, allowing simultaneous reads and writes. Each allocation group has its own AG header 607 and sets of inode and data blocks 608.

Figure 6B:
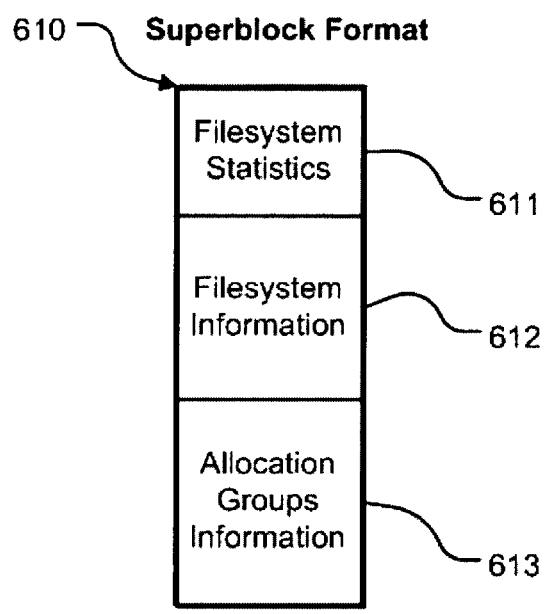
FIG. 6B shows the format of the Superblock portion of the WORM filesystem of the preferred embodiment of the present invention.

FIG. 6B generally illustrates the superblock layout 610 of WORM VFS filesystem. The superblock consists of filesystem statistics 611 (such as amount of free space and number of files), filesystem information 612 (such as the allocation group sizes and volume characteristics) and allocation group information 613 (such as the location of each allocation group and its extent size). Two copies of the filesystem superblock are stored contiguously on the volume, in case one gets corrupted. There is also an in-core copy to which updates are made. The filesystem statistics 611 portion of in-core superblock is written to disk on a regular basis. The filesystem information 612 and allocation group information 613 are written for new volumes only and are used mostly for filesystem mounts.

Figure 6C:
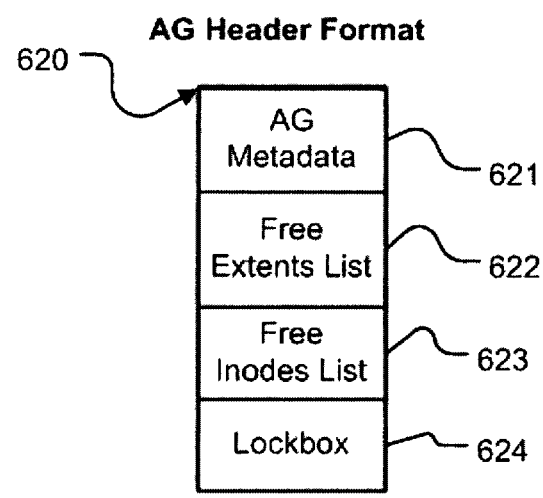
FIG. 6C shows the format of the AG Header for each Allocation Group in the WORM filesystem of the preferred embodiment of the present invention.

FIG. 6C generally illustrates the layout of each allocation group (AG) header 620 of the WORM VFS filesystem. The AG header 620 consists of AG metadata 621, a free extents list 622, a free inodes list 623 and a key lockbox 624. AG metadata 621 contains the location of the root inode (from which all other inodes can be found), the number inodes in use and other AG specific data. The free extents list 622 and free inodes list 623 is maintained by the Space Manager 504 for each AG, for use between system boots. The lockbox 624 contains session keys used by the Encryption Unit 506 to encrypt the AG's inodes before volume writes. Like the superblock, there is both an on-disk and in-core copy of each AG header 620. Updates are written to the in-core AG header, which is written to disk encrypted, using the public certificate, on a regular basis, but not later than a full traversal of the journal ring buffer. Modifications to the AG headers are spin-locked to ensure consistency.

Figure 6D:
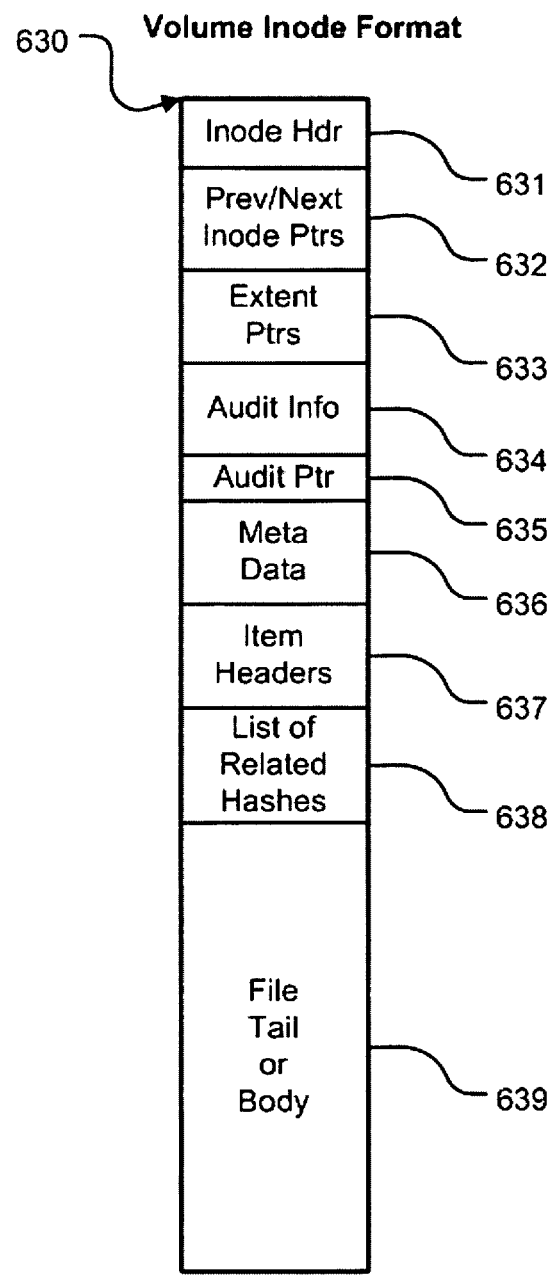
FIG. 6D shows the format of each disk inode in the WORM filesystem of the preferred embodiment of the present invention.

FIG. 6D generally illustrates the layout of each inode 630 of the WORM VFS filesystem. Sections 636, 637, 638 are the same sections from FIG. 3D of the structured file format 340 passed down from the storage administrator 204. Each inode starts with an inode header 631 which contains a version number and any volume specific information. Each inode is part of a linked list of all in use inodes. The linked list of used inodes is doubly linked using the previous\next pointers 632. Next is a block of extent pointers 633 to the file's data. A small section holds audit or annotation data 634 (such as whether a file has been reviewed for compliance, who last accessed the file, etc) within the inode. If additional audit data space is needed, space for an audit block pointer 625 is included. The rest of the inode 639, after sections 636, 637, 638, is used to either store the entire body of the electronic data file or the partial block comprising the tail of the file. This reduces disk usage and increases performance, as small files can be completely read by just accessing the inode and larger files will not be wasting partial data blocks. Since archived files are usually read in its entirety, reading the tail along with the inode data also helps performance. Besides the on-disk inode 630, there will be an in-core copy of the inode while it is open for create or read.

Figure 6E:
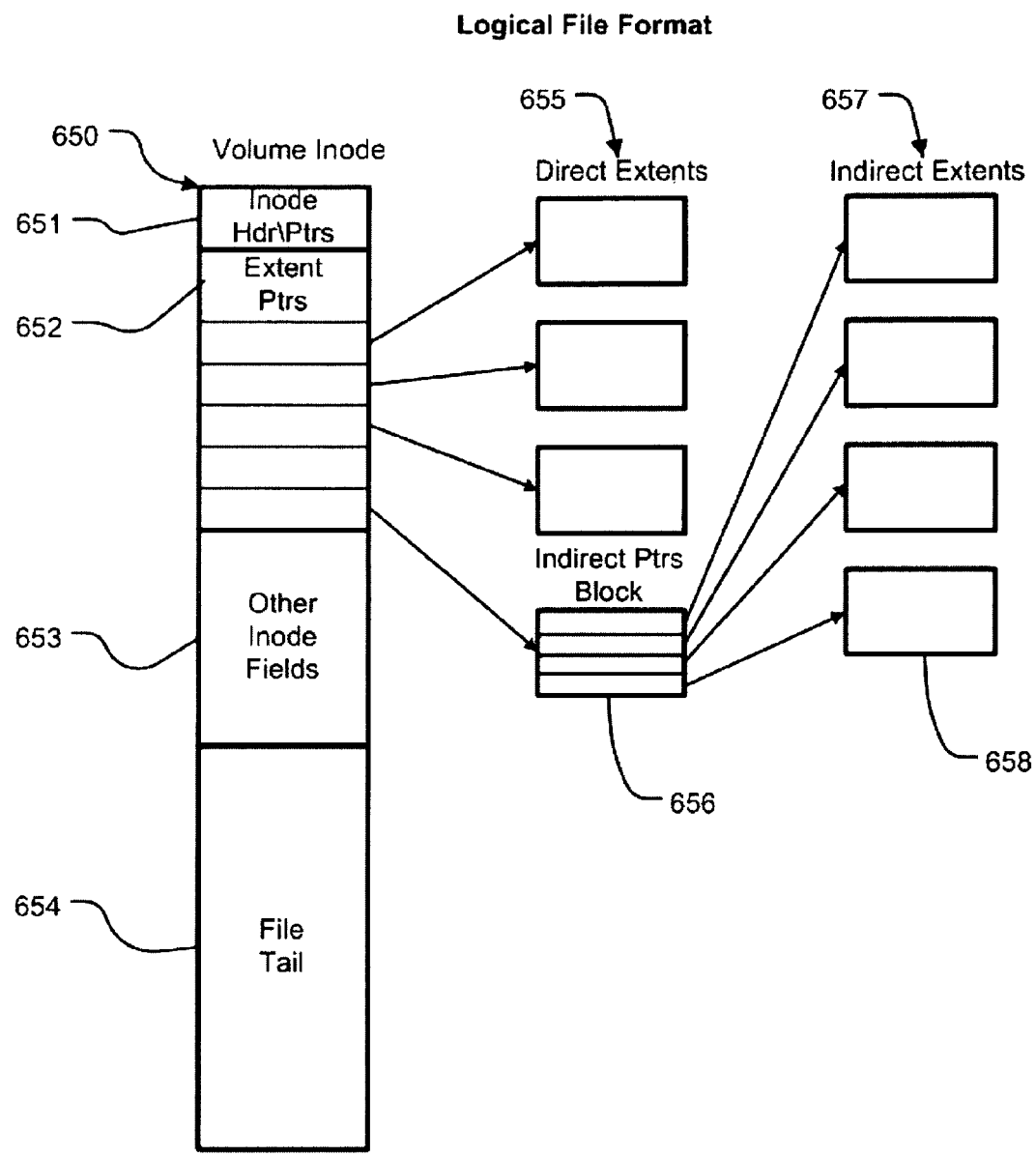
FIG. 6E shows the logical file layout of the WORM filesystem of the preferred embodiment of the present invention.

FIG. 6E shows an example of a logical layout of a file in the WORM VFS filesystem. The inode 650 format is the same as that described in FIG. 6D, but some fields are not shown for to clarify the illustration. As before, the inode starts with an inode header and inode linked list pointers 651. The extent pointers 652 are next, followed by other inode fields 653 not detailed for this example. The space at the end of the inode is used for the file's tail 654 (last few bytes), but could be used for the entire file's data in other instances. The extent pointers 652 point to several direct extents 655 that contain the file's data. Each extent is made up several contiguous data blocks. The number and size of data blocks are optimized by volume and the values are stored in the filesystem information portion of the superblock. If the file runs out of pointers to direct extents 655, the last extent pointer points to a data block 656 instead of an extent. This data block contains a list of indirect extent pointers 656. Each pointer in this block points to an indirect extent 657, except for the last pointer, which will point to an extent which is partially used 658. The inode header 650 stores the information about how many direct and indirect extents are used and which blocks in the last extent are used. Unused blocks in the last extent are returned to the Space Manager 504, which can subsequently allocate the blocks to the end of a new file.

Figure 7:
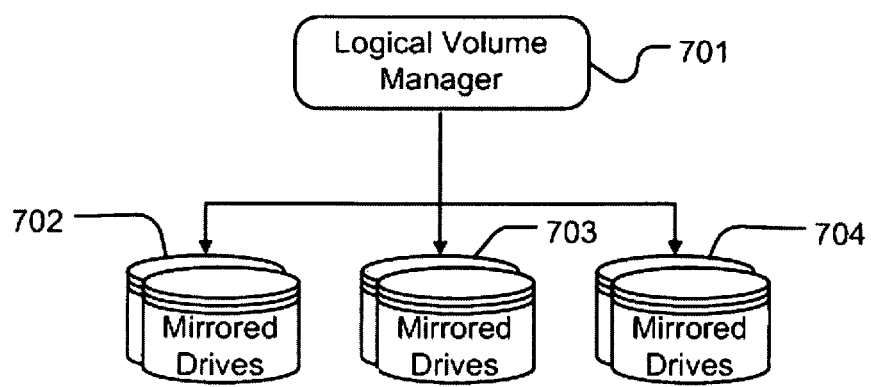
FIG. 7 shows the components of the Logical Volume Manager of the preferred embodiment of the present invention.

FIG. 7 shows an example of the logical volume manager 701 of the preferred embodiment of the present invention. The logical volume manager 701 is designed to group a set of physical disks 702, 703, 704 into a single volume. It should be understood that this example is for illustrative purposes only; there can be any number of disks in a volume, there can be any number of volumes in a system and they don't have to be mirrored. It should also be understood that the system could comprise of a single physical disk, in which case the logical volume would be the same as the physical disk.

Besides grouping physical disks into logical volumes, logical volume manager 701 handles several normal events, such as disk failures, disk full and disk insertion, so that human operators can be alerted.

If a disk in the volume has errors or fails completely, the logical volume manager 701 will notify the operator via the storage administrator 204 and flag the disk as corrupt. The operator can then put the disk offline, replace it and put it back online. The logical volume manager 701 (or RAID) will mirror the new drive.

When a volume nears its capacity, the logical volume manager 701 will notify the storage administrator 204. When the volume is at its maximum capacity (some room is left for audit messages), the logical volume manager 701 will flag the volume as read only, not allowing more electronic data files to be added to the volume. If no new volumes are available, the system is signaled to not allow new electronic data files.

The operator can put online a previously written volume for analysis. The logical volume manager 701 will detect this and tell the storage administrator 204 to scan the inodes and load the metadata into the index database 205.

Figure 8A:
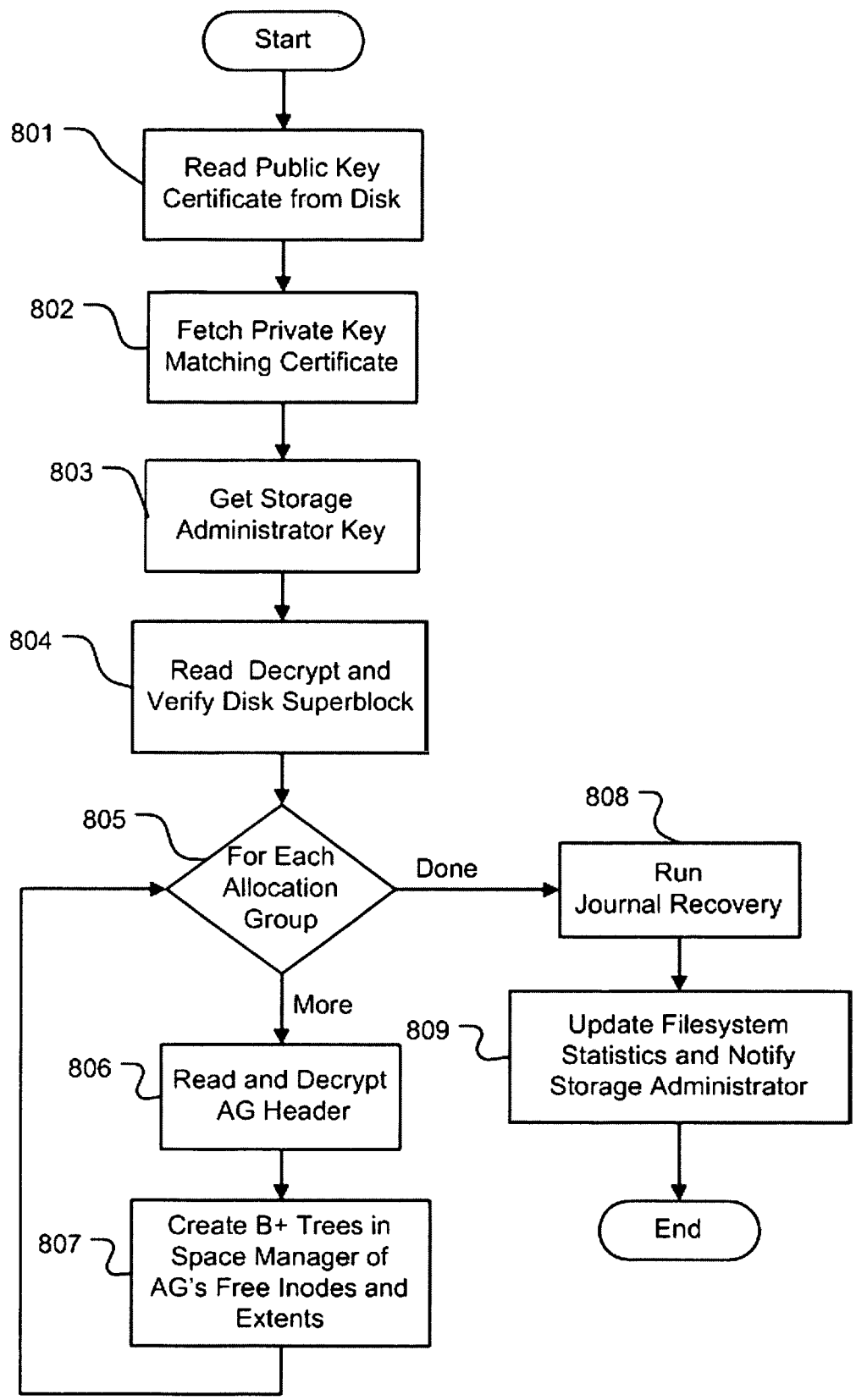
FIG. 8A is a block diagram illustrating a method of the present invention for mounting the WORM FS.

FIG. 8A is a block diagram illustrating a method of the present invention for mounting a volume containing a WORM VFS filesystem. After the boot block is read, the volume's public key certificate is read 801 for later encryption of the volume's superblock and allocation group lockboxes as they are modified. The matching private key certificate is fetched 802, either from a hardware dongle or other means. A new storage administrator key is created by the WORM VFS filesystem using random data generated by the storage administrator 204, encrypted with the public key certificate and passed within the mount function call. This same key is created by the storage administrator 204. This key is subsequently included in all file system operations to verify that it came from the storage administrator. The superblock is read, decrypted with the private key certificate and verified 804, and used to locate each allocation group. Each allocation group is processed in turn 805. The allocation group's header is read in and decrypted with the private key certificate 806. The space manger adds B+ trees for the list of free inodes and free extents 807. When all allocation groups have been processed, journal recovery is run 808 as described in FIG. 5D. Finally, the filesystem statistics are updated and the storage administrator 204 is notified the volume is ready for use 809.

Figure 8B:
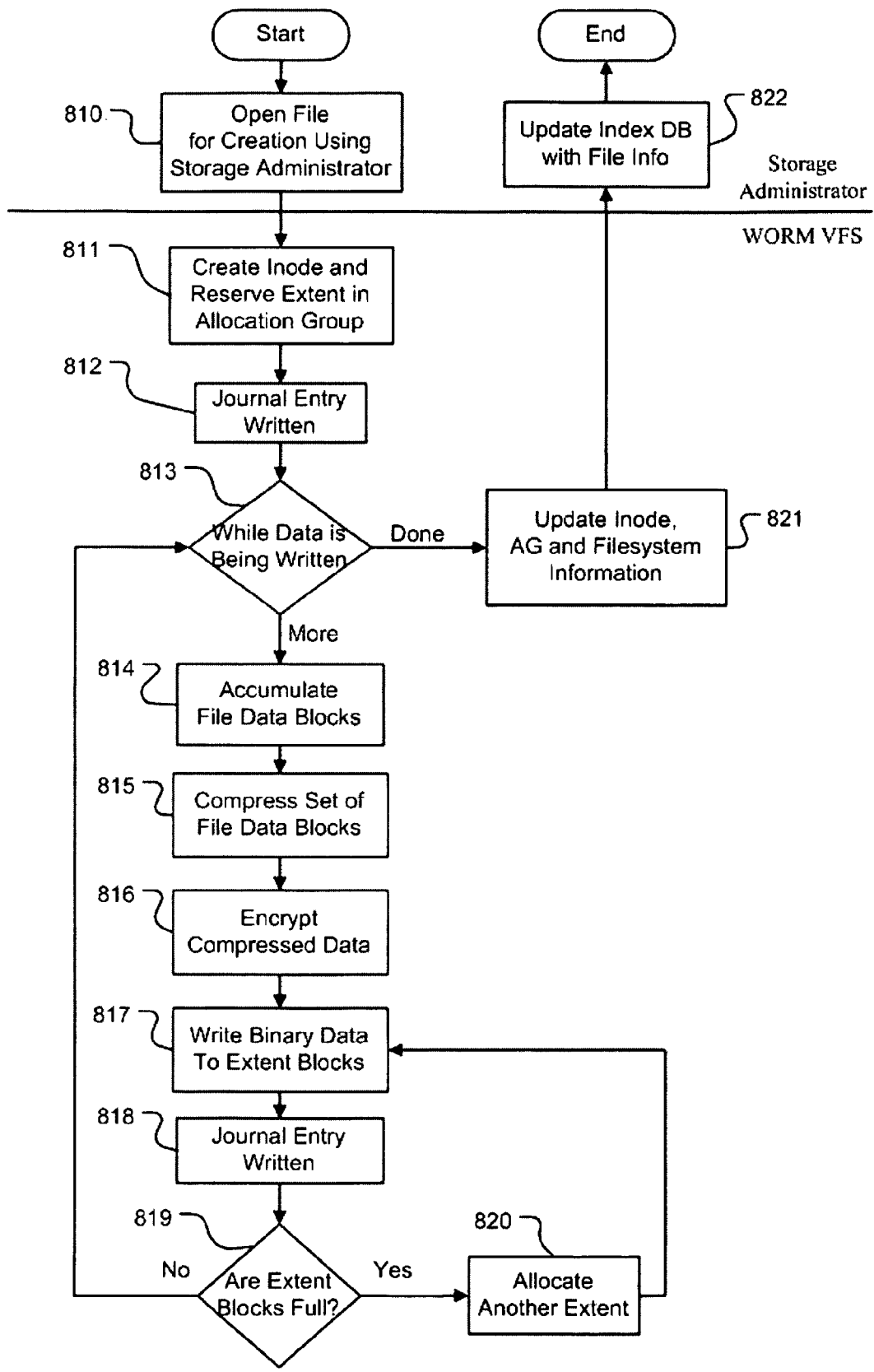
FIG. 8B is a block diagram illustrating a method of the present invention for creating a file within the WORM FS.

FIG. 8B is a block diagram illustrating a method of the present invention for creating a new on-box file within the WORM VFS filesystem. A user application first calls the storage administrator 204 to open a new file for creation 810. The storage administrator 204 performs a VFS call to the WORM VFS to create a new inode and reserve its first extent of data blocks 811. A journal entry is written in case of later recovery 812. In a loop 813 while file data is being written by the storage administrator 204 via VFS calls, data blocks are accumulated 814. When enough file data blocks are accumulated, they are compressed 815 and encrypted 816. The encrypted binary data is written to extent blocks 817. Each extent write generates a journal entry in case of later recovery 818. If all the blocks in the current extent are used 819, a new extent is allocated 820 and the inode is updated. Once all the file data is written out, the file inode, the allocation group header and the filesystem statistics are updated 821. The storage administrator 204 is notified, which updates the index database 205 with the file identification and file location 822.

Figure 8C:
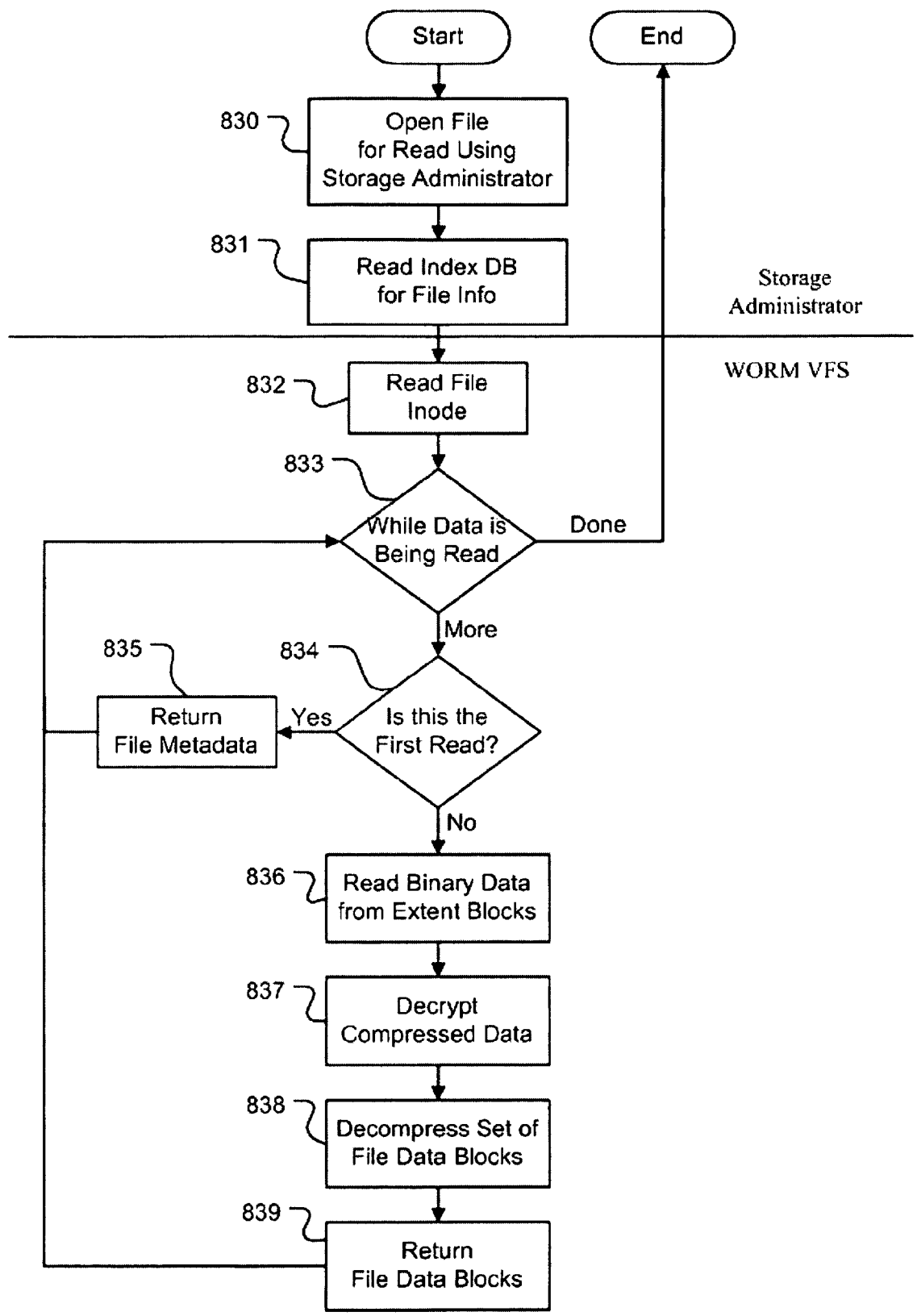
FIG. 8C is a block diagram illustrating a method of the present invention for reading a file from the WORM FS.
Figure 8D:
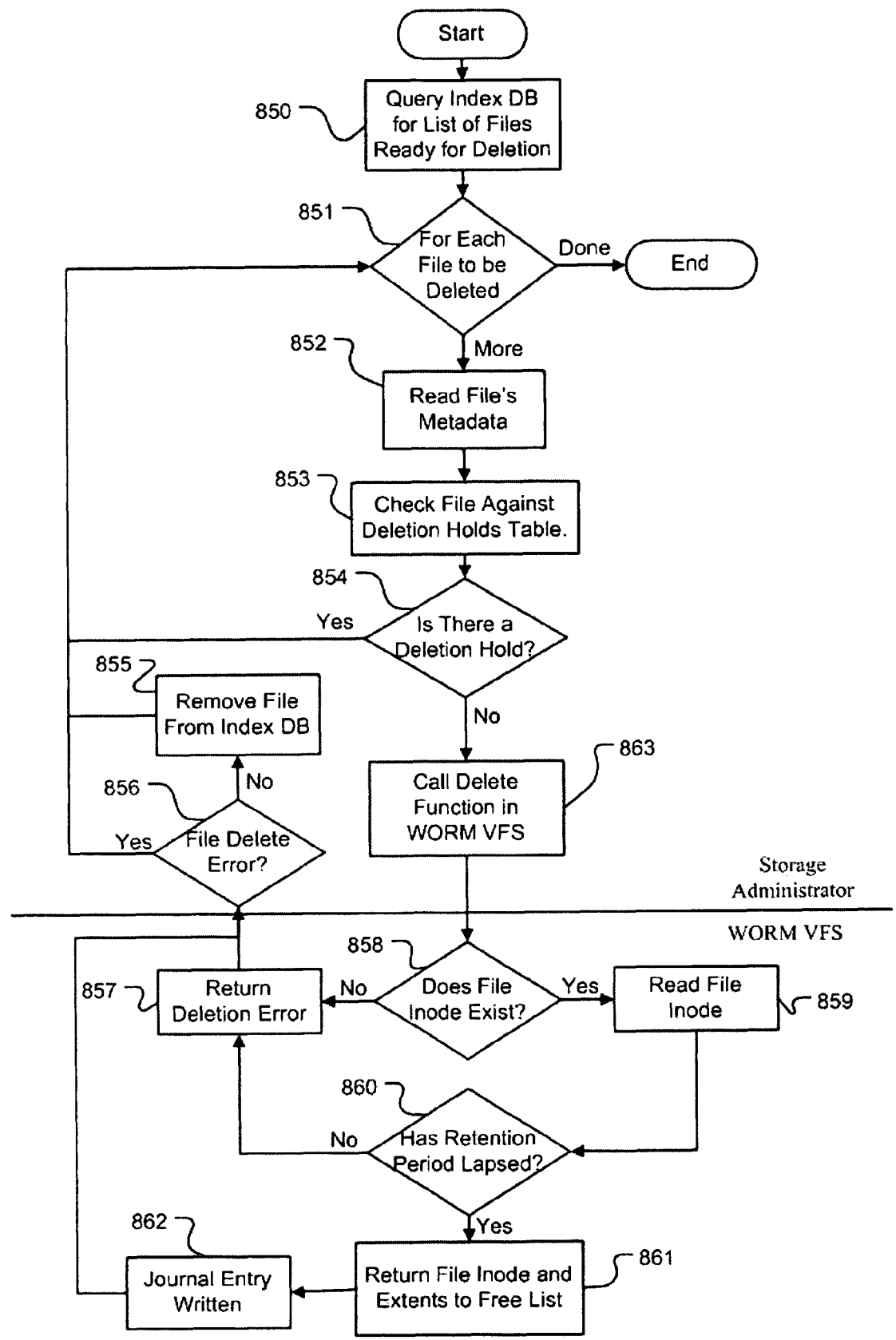
FIG. 8D is a block diagram illustrating a method of the present invention for deleting a file within the WORM FS.

FIG. 8C is a block diagram illustrating a method of the present invention for reading an existing on-box file within the WORM VFS filesystem. A user application first calls the storage administrator 204 to open an existing file for read 830. The storage administrator 204 looks up the file location using the file identification 831. The storage administrator 204 then performs a VFS call to the WORM VFS to open in the existing file inode for reading 832. After the file is opened, the storage administrator 204, via VFS calls, starts reading the file data in a loop 833. If this is the first read 834, the file's metadata stored in the inode is returned 835. Subsequent calls read data from the file's extent blocks 836, decrypt the data 837, decompress the data 838 and return the file data blocks 839. Note that sequential reads are only supported, random access is not supported.

FIG. 8D is a block diagram illustrating a method of the present invention for deleting an existing on-box file within the WORM VFS filesystem. At regular intervals, a process is run within the storage administrator 204 to delete electronic data files that have passed their retention period. The storage administrator 204 first queries the index database 205 for a list of files eligible for deletion 850. In a loop 851, each file in the list is checked to see if a deletion hold matches it and is then deleted if no deletion hold is in place. To perform this, the storage administrator 204 reads in the file's metadata (first read access) 852. It then checks the rules 853 in the deletion holds table 360 and sees if there is a match 854. If there is, the file is skipped. If not, a delete call 863 is made to the WORM VFS via the VFS interface. The WORM VFS filesystem first checks if the file inode exists 858. If not, an error is returned 857 to the storage administrator 204. If the file inode exists, its retention period stored in the inode is checked 860. If the retention period is not over, an error is returned 857 to the storage administrator 204. This ensures files are never deleted before its retention period has passed. If the retention period has lapsed, the file inode and its related data extents are released back to the space manager's free list 861 and a journal entry is written in case of later recovery 862. Upon return from the delete call to the WORM VFS, the storage administrator 204 checks for file deletion errors 856. If no error occurred, the file identification and file location record is removed 855 from the index database 205.

What is claimed is:

1. A method for efficiently storing an electronic communication in a write once, read many times (WORM) storage system, comprising the steps of:

receiving a request to open a new file by a third party user space application; and performing a virtual file system call by the storage administrator to the WORM filesystem requesting the creation of a storage entity; and creating said storage entity within the storage system by said WORM filesystem layer, comprising the steps of:
allocating an inode in said WORM filesystem layer; and
allocating an initial contiguous storage extent within the allocation group of said WORM filesystem layer;

whereby said electronic communication can be stored in said storage entity and later retrieved in its entirety; and accumulating blocks of said electronic communication by said storage administrator from said user space application; and parsing of said blocks of said electronic communication by said storage administrator to record the location of each message section of said electronic communication; and transferring said blocks of said electronic communication by said storage administrator to the said storage system until the electronic communication has been transferred, in its entirety, from the said user space application to the said storage system via the storage administrator; and compressing the said blocks of said electronic communication to create compressed data blocks; and encrypting said compressed data blocks to create encrypted data blocks; and writing said encrypted data blocks to said initial contiguous storage extent and to additionally allocated contiguous storage extents within the same said allocation group of said storage system until all said encrypted data blocks are stored in contiguous storage extents within the same said allocation group of said storage system; and modifying said inode and said allocation group of said storage system with meta information about said electronic communication and said contiguous storage extents used within the said allocation group of said storage system to facilitate later retrieval of said data; and modifying said meta information of said inode with said location of each said message section of said electronic communication; and writing the said modified inode to the said storage system; whereby said electronic communication is stored in the said storage system, such that said electronic communication is written to the said storage system in its entirety and said data cannot be modified or deleted after said data is written.

2. A method of claim 1, wherein each said storage entity is represented to the said user space application as a file.

3. A method of claim 1, wherein an entry is written in a non-volatile RAM journal after the said inode is created and after all the said encrypted data blocks in its entirety are written to extents of said storage system, wherein the said journal entries are processed on start up of the said storage system to remove said inodes that were created, but not all said encrypted data blocks were written to extents within said storage system.

4. A method of claim 1, wherein said user space applications are unable to access the said storage system directly, but must access said storage system through a kernel module, which provides a secure interface.

5. A method of claim 1, wherein the said electronic communication embodies a messaging protocol, and the accumulated said blocks of said electronic communication is parsed according to the format of the said messaging protocol, with the resulting meta information obtained from parsing the said electronic communication written to the said inode.

6. A method of claim 5, wherein the said meta information is stored in a searchable database along with location information for the said inode, for use in later retrieval.

7. A method of claim 1, wherein the said WORM filesystem layer employs internally accessible physical disk drives.

8. A method of claim 1, wherein the contents of said electronic communication comprises one of the SMTP, Microsoft Exchange, MSN IM, Yahoo IM, SMS, HTTP, VoIP or RSS messaging protocols.

9. A device for storing an electronic communication in a write once, read many times (WORM) storage system, comprising:

a server containing at least one processor coupled with memory and containing one or more physical disk drives; and a storage administrator that provides a single, secure interface to a WORM VFS for user space applications, such that the said WORM VFS is inaccessible by any other means except through the said storage administrator; and a said WORM VFS providing compressed, encrypted and write once, read many times storage of said data, said WORM VFS comprising of:

a logical volume manager that groups said physical disk drives into one or more logical drives; and a WORM file system layer, comprising of:

a space manager that manages free inodes and extents within the said WORM file system layer; and an encryption unit that encrypts and decrypts inodes used in said WORM file system layer; and a buffer cache to keep recently used inodes and data blocks in said WORM file system layer available; and a journal manager to facilitate recovery from system crashes by storing journal entries whenever an inode in said WORM file system layer is allocated for said data, said data is written to said inode, said data and said inode is deleted or an audit record relating to said inode is recorded;

wherein said WORM file system layer provides a WORM file system service on each said logical drive, such that all data is stored in an encrypted physical file system layout incompatible with well-known file system formats; and a data encryption and compression layer that compresses and encrypts said electronic communication when transferred from the said storage administrator to the said WORM file system layer, and decrypts and decompresses said electronic communication transferred from the said WORM file system layer to the said storage administrator;

wherein said device provides WORM storage of said electronic communication in the system, such that said electronic communication cannot be modified or deleted after said electronic communication is written to said WORM VFS.

10. A device of claim 9, wherein a said electronic communication can be deleted after a retention period associated with said electronic communication expires.

11. A device of claim 9, wherein said data encryption and compression layer selectively transfers the said electronic communication to either the on-box said WORM file system layer or off-box WORM storage provided by a third party vendor.

12. A device of claim 9, wherein the said user space applications execute on third party vendor devices and access the said storage system through a network interface.

13. A device of claim 9, wherein said WORM VFS is implemented as a UNIX virtual file system.

14. A device of claim 9, wherein the said space manager employs B+ trees to store the free inodes and extents.

15. A device of claim 9, wherein said storage administrator executes a parsing routine to record the location of each message section of said electronic communication and passes said location to the said WORM file system layer.

16. A method for selectively deleting a file containing an electronic communication embodied as a messaging protocol in a write once, read many times (WORM) storage system, comprising the steps of:

creating a set of simple conditions comprising of a attribute type, followed by a logical operator, which is followed by a value pattern; and creating a set of compound conditions comprising of one or more said simple conditions and one or more Boolean operators, wherein each said simple condition is followed by said Boolean operator, which is followed a second said simple condition; and creating one or more deletion policy rules, each said deletion policy rule comprising one said compound condition or one said simple condition; and aggregating all said deletion policy rules into a deletion holds table; and parsing said electronic communication within said file using the format of said messaging protocol to obtain the constitute protocol elements; and reading the meta information corresponding to said file from said storage system; and obtaining user information corresponding to said file; and processing each said deletion policy rule in said deletion holds table, comprising the steps of:

evaluating each simple condition in said deletion policy rule using the said protocol elements, said meta information or said user information corresponding to the said attribute type; and evaluating each compound condition in said deletion policy rule using the evaluation results of said simple conditions; and evaluating said deletion policy rule based on the evaluation results of said simple conditions and said compound conditions;

wherein each said deletion policy rule is evaluated to true or false; and deleting said file only if all said deletion policy rules in said deletion holds table evaluate to false;

whereby said file is prevented from being deleted if said protocol elements, said meta information or said user information corresponding to said file matches the said compound condition or said simple condition of a said deletion policy rule in said deletion holds table and said deletion policy rule evaluates to true.

17. A method of claim 16, wherein the said attribute types comprises of the message protocol header types, the file types, the user information types and meta data information types relating to the said electronic communication.

18. A method of claim 16, wherein the said value pattern comprises of a regular expression.

19. A method of claim 16, wherein the contents of said file comprises one of the SMTP, Microsoft Exchange, MSN IM, Yahoo IM, SMS, HTTP, VoIP or RSS messaging protocols.

* * * * *